Nov. 9, 1937. H. G. PROCUNIER 2,098,675
TOOL HOLDING CHUCK AND COLLET THEREFOR
Filed Feb. 15, 1936
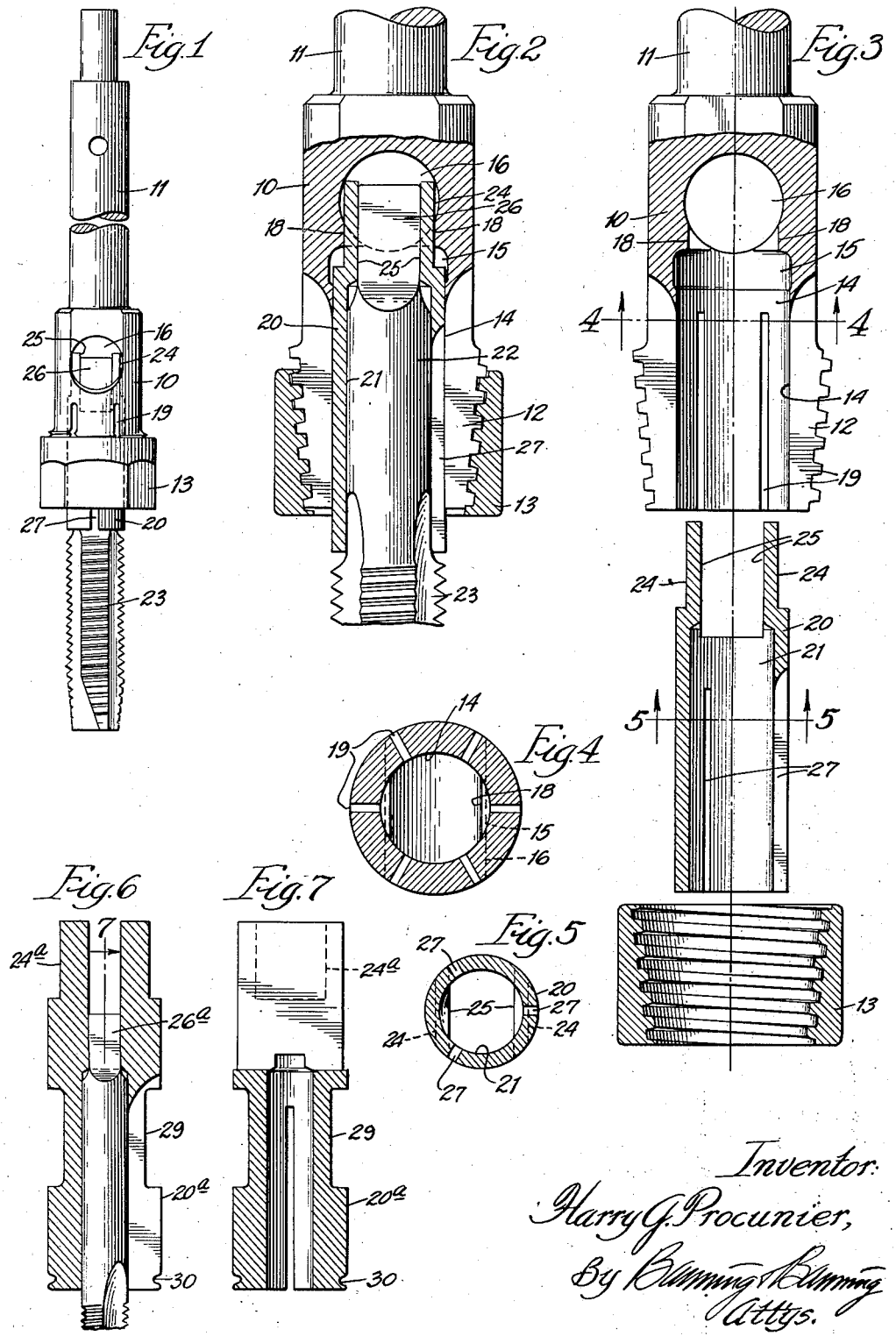
Inventor:
Harry G. Procunier,
By Cumming & Cumming
Attys.

Patented Nov. 9, 1937

2,098,675

UNITED STATES PATENT OFFICE 2,098,675

TOOL-HOLDING CHUCK AND COLLET THEREFOR

Harry G. Procunier, Chicago, Ill., assignor to Procunier Safety Chuck Company, Chicago, Ill., a corporation of Illinois Application February 15, 1936, Serial No. 64,058

3 Claims. (Cl. 279—42)

An object of this invention is to provide a simple, light and efficient form of chuck and collets therefor for holding taps, drills, reamers, and the like, of various sizes having round shanks with squared or flat ends.

Another object is to provide a tool holder and collet of this type which will drive the tool through the flat portion entirely, the holder serving to grip the round portion only to hold and align the tool.

These and other objects, as will hereinafter appear, are accomplished by this invention which is fully described in the following specification and shown in the accompanying drawing, in which—

Figure 1 is a side elevation of a chuck with a collet and tap in place;

Fig. 2 is a partial enlarged longitudinal section of the same;

Fig. 3 is a view similar to Fig. 2 showing the body of the chuck, the collet and a retaining nut disassembled;

Fig. 4 is a transverse section on the line 4—4 of Fig. 3;

Fig. 5 is a transverse section on the line 5—5 of Fig. 3;

Fig. 6 is a longitudinal section through a collet for a smaller tap showing a tap in place therein; and Fig. 7 is a longitudinal section on the line 7 of Fig. 6, but with the tap removed.

The embodiment illustrated comprises a chuck body 10 having a shank 11 of any well known form, the shank shown being adapted for use in my tapping attachment shown in my Patent No. 1,781,192, granted November 11, 1930. The lower end of the chuck body 12 is tapered and threaded to receive a nut 13. As shown in Fig. 2, the internal conical taper of the nut is greater than the external conical taper of the lower end of the body 12. I prefer to make the internal conical taper of the nut 5° and that of the lower end of the body 12, 3½°. Thus when the nut is screwed on the body, the nut applies maximum pressure thereto always near the outer end of the body. The purpose of this will later be seen.

The body 12 is provided with an internal bore 14 which is preferably ground, the bottom of this bore being provided with a counterbore 15 to assist in grinding. A transverse hole 16 is provided in the body near the upper end of the bore with which it communicates. In machining the bore 14 a communication, shown dotted in Figs. 3 and 4, is left with the transverse hole 16. This is later partially cut away by means of a broach (not shown) which leaves two flat surfaces or lands 18 (Fig. 4). The lower end of the body is longitudinally slotted at 19 so as to permit the end of the chuck to move inwardly as the nut is applied.

A collet or adapter 20, as shown in Figs. 3 and 5, is ground externally to fit the bore 14, and has a ground opening 21 adapted to fit the round shank 22 of a tap or the like 23 (Fig. 2). The upper end of the collet is machined to provide two flat external portions 24 which are adapted to engage the lands 18 of Fig. 3. It is also machined internally to form two flat surfaces 25 which are adapted to engage the upper square or flattened end 26 of the tap or other tool to be driven. The lower end of the collet is longitudinally slotted at a plurality of lines 27 to provide a plurality of fingers 28 which are flexible so that they can readily be pressed inwardly to grip the shank of the tool.

Thus it will be seen that with the nut 13 loosened, a tool together with a suitable collet can be inserted in the body of the chuck and by tightening the nut the lower end of the chuck body will be pressed in against the collet, and this in turn will be pressed against the round shank of the tool, thereby frictionally securing the tool and collet in the chuck. The actual driving of the tool, however, is done through the flat lands 18 acting on the flattened portions 24 of the collet and thence to the squared or flattened ends 26 of the tool. Thus even where the metal between the surfaces 24 and 25 of the collet are quite thin, they will not be subjected to any unusual strains for the reason that the force exerted is almost entirely one of compression. It will be noted that the chuck is designed to be used without a collet for the largest size tool. In that case the shank of the tool fits the bore 14 and the squared portion of the tool fits the lands 18.

In Figs. 6 and 7 is shown a collet for a small size tool. In this case the squared portion 26ᵃ of the tool may not extend up far enough to be opposite the outer squared surface 24ᵃ. In this case, however, the collet is relatively much stronger than the tool so that it can readily take the extra stress. The collet 20ᵃ is preferably necked at 29 to render it more flexible. A groove 30 may be added to any of the collets, if desired, to provide a means by which the collet may be more readily grasped for withdrawal from the chuck from which it preferably projects.

While I have shown and described but a few embodiments of my invention, it is to be understood that it is capable of many modifications. Changes, therefore, in the construction and arrangement may be made which do not depart from the spirit and scope of the invention as disclosed in the appended claims.

I claim:

1. A chuck for tools having cylindrical shanks with flat ends, said chuck comprising a body having a longitudinal bore and a transverse cylindrical hole which intersects the end wall of the bore a chordal distance less than the diameter of the bore thereby forming diametrically opposite shoulders at the inner end of the bore, said shoulders having their opposed edge portions removed to form flat tool end engaging surfaces to provide driving connections between the chuck and tool, and means at the outer end of the chuck for clamping the tool therein.

2. A collet for use with a chuck having a longitudinal bore and a transverse hole which intersects the end wall of the bore with diametrically opposed shoulders at the inner end of the bore forming flat tool end engaging surfaces to provide driving connections, said collet adapted to provide for use of a tool having a shank of less diameter than the cylindrical bore and having a cylindrical tubular portion adapted to fit over the shank of the tool and within the bore of the chuck and having at one end internal flattened surfaces adapted to engage the flattened surfaces on the end of the tool shank and external flattened surfaces adapted to engage the flat tool engaging surfaces within the chuck, the other end of the collet being slotted to provide gripping fingers.

3. A collet for use with a chuck having a longitudinal bore and a transverse hole which intersects the end wall of the bore with diametrically opposed shoulders at the inner end of the bore forming flat tool end engaging surfaces to provide driving connections, said collet adapted to provide for use of a tool having a shank of less diameter than the cylindrical bore and having a cylindrical tubular portion adapted to fit over the shank of the tool and within the bore of the chuck and having at one end internal flattened surfaces adapted to engage the flattened surfaces on the end of the tool shank and external flattened surfaces adapted to engage the flat tool engaging surfaces within the chuck, the other end of the collet being slotted to provide gripping fingers, the internal and external flattened surfaces of the collet being parallel.

HARRY G. PROCUNIER.